US006856935B1

United States Patent
Fehlis et al.

(10) Patent No.: US 6,856,935 B1
(45) Date of Patent: Feb. 15, 2005

(54) CAMERA TRACKING SYSTEM FOR A VIRTUAL TELEVISION OR VIDEO STUDIO

(75) Inventors: Hendrik Fehlis, Hennef (DE); Thomas Mayer, Sankt Augustin (DE); Uwe Schnepf, Sankt Augustin (DE); Thorsten Mika, Leverkusen (DE)

(73) Assignee: GMD-Forschungszentrum Informationstechnik GmbH, Sankt Augustin (DE)

( * ) Notice: Subject to any disclaimer, the term of this patent is extended or adjusted under 35 U.S.C. 154(b) by 0 days.

(21) Appl. No.: 09/601,838
(22) PCT Filed: Feb. 18, 1999
(86) PCT No.: PCT/EP99/01062
§ 371 (c)(1),
(2), (4) Date: Aug. 9, 2000
(87) PCT Pub. No.: WO99/43150
PCT Pub. Date: Aug. 26, 1999

(30) Foreign Application Priority Data

Feb. 18, 1998 (DE) .......................................... 198 06 646
Sep. 5, 1998 (DE) .......................................... 198 40 656

(51) Int. Cl.⁷ ........................ G01C 17/00; G01C 19/00; G01C 9/00; G06F 15/00
(52) U.S. Cl. ........................ 702/152; 702/150; 702/153
(58) Field of Search .................................. 702/153, 150; 348/579, 587; 345/435

(56) References Cited

U.S. PATENT DOCUMENTS

| | | | | |
|---|---|---|---|---|
| 3,910,693 A | * | 10/1975 | De La Cierva | 352/244 |
| 5,897,223 A | * | 4/1999 | Tritchew et al. | 396/13 |
| 6,201,579 B1 | * | 3/2001 | Tamir et al. | 348/579 |
| 6,438,508 B2 | * | 8/2002 | Tamir et al. | 702/153 |
| 2001/0001242 A1 | * | 5/2001 | Tamir et al. | 345/435 |
| 2001/0048483 A1 | * | 12/2001 | Steinberg et al. | 348/587 |

FOREIGN PATENT DOCUMENTS

| | | | |
|---|---|---|---|
| DE | 01-9418382 | 5/1996 | |
| EP | A2689356 | 12/1995 | |
| GB | 2 305 050 | * 3/1997 | .......... H04N/5/272 |
| GB | 2 312 125 | * 10/1997 | .......... H04N/5/222 |
| GB | 2 323 733 | * 9/1998 | .......... H04N/5/222 |
| GB | 2 324 429 | * 10/1998 | .......... H04N/5/262 |
| GB | 2 329 292 | * 3/1999 | ............ G01S/5/16 |
| WO | A1-9405118 | 3/1994 | |
| WO | A1-9632697 | 10/1996 | |
| WO | A1-9714253 | 4/1997 | |
| WO | A1-9834410 | 8/1998 | |
| WO | WO 98/54593 | * 12/1998 | |
| WO | A1-9914939 | 3/1999 | |

OTHER PUBLICATIONS

Jin et al., IBC, Conference Publication 10 pages (1997).
Sommerhaeuser, Virtuelles Studio, pp. 11–22 (1996).

* cited by examiner

Primary Examiner—John Barlow
Assistant Examiner—Aditya Bhat
(74) Attorney, Agent, or Firm—Birch, Stewart, Kolasch & Birch, LLP

(57) ABSTRACT

A camera tracking system for a virtual television or video studio is provided. The camera tracking system is used to determine the position and/or orientation of recording cameras and comprises emitter devices for emitting electromagnetic radiation. The emitter devices can be mechanically coupled to the recording camera. The camera tracking system further comprises detecting devices for detecting the position of the emitter devices on the basis of the electromagnetic radiation emitted by the emitter devices, each detecting device being able to detect several emitter devices. A computer unit evaluates the electromagnetic radiation detected by the detecting devices and emitted by the emitter device, and determines the position and/or orientation of the emitter devices in relation to the detecting devices.

22 Claims, 5 Drawing Sheets

CAMERA TRACKING SYSTEM FOR A VIRTUAL TELEVISION OR VIDEO STUDIO

This application is the national phase under 35 U.S.C. § 371 of PCT International Application No. PCT/EP99/01062 which has an International filing date of Feb. 18, 1999, which designated the United States of America.

BACKGROUND OF THE INVENTION

1. Field of the Invention

The present invention relates to a novel camera tracking system for a virtual television or video studio.

2. Description of the Background Art

In producing virtual film or video sequences, the images recorded by a camera, for example, images of a person, are combined in a special device with a background (electronic set) that is not really present (i.e. virtual), or with other details generated in the device (a so-called virtual studio). In order to integrate the person filmed by the camera into the virtually generated background with precision and positional accuracy, the respective actual position and orientation of the recording camera (studio camera) must be known.

Conventionally, the position of the recording camera has been calculated, starting from a zero position, by measuring the distance traveled and the Orientation of the camera has been determined by measuring the pivot angle, the pitch angle, and the rolling angle using corresponding incremental sensors (Sommerhäuser, F.: Das virtuelle Studio; in: FERNSEH- UND KINO-TECHNIK, 50. Jhrg., 1996, Nr. 1–2, p. 11–15, 18–22). To this end it is necessary to install corresponding incremental sensors on the camera and at each joint and at each axis of its stand (tripod). This known system requires a relatively high effort in measurement techniques.

From Interner Broadcast Convention IBC '97, Convention Publication, pages 284–289, and WO-A-94105118, respectively, a camera tracking system is known wherein the camera is provided with an auxiliary camera directed towards the studio ceiling for detecting bar code marks on the studio ceiling. Using the bar codes detected by the camera, a corresponding computer can determine the exact position of the camera in the studio. Through this known camera tracking system, the position of the camera in the studio may be determined, however, incremental sensors still have to be used to determine the height of the camera above the ground and to determine the pivot angle, the rolling angle and the pitch angle of the camera.

From EP-A-0 689 356, a voice controlled video system is known, wherein a video camera is orientated by the voice of a person. Here, a person sends signals to the video system via corresponding emitters so that the video camera can follow the movements of the person in order to permanently detect the person.

SUMMARY OF THE INVENTION

It is therefore an object of the present invention to provide a camera tracking system that precisely, quickly and reliably determines the position and orientation of a camera that is adapted to be moved freely in a room.

According to the invention, the object is solved with a camera tracking system comprising having: at least three emitter devices for emitting electromagnetic radiation, the emitter devices being adapted to be mechanically coupled with the recording camera; at least two detector devices for detecting the position of the emitter devices based upon the electromagnetic radiation emitted by the emitter devices, each detector device being adapted to detect a plurality of emitter devices; and a computer unit for evaluating the electromagnetic radiation detected by the detector devices and emitted by the emitter devices and for determining the position and/or the orientation of the at least three emitter devices relative to the at least two detector devices.

In the present camera tracking system, at least three emitter devices emit electromagnetic radiation, the emitter devices being adapted to be coupled with the recording camera either directly or indirectly, e.g., via the stand of the recording camera. The emitter devices may be provided as active or passive devices. Whereas an active device generates and emits electromagnetic radiation, a passive emitter device operates on the reflector principle, reflecting electromagnetic radiation. The electromagnetic radiation from the emitter devices is detected by at least two detector devices. Each detector device is able to simultaneously and selectively detect a plurality of emitter devices, the relative position of the detected emitter devices being determined through each detector device. Whether a detector device detects a single emitter device or a plurality of emitter devices depends on the orientation of the recording camera with which the emitter devices are mechanically coupled, either directly or indirectly. Each detector device is itself connected to a computer for evaluating the electromagnetic radiation detected by the detector devices and emitted from the emitter devices, by determining the position and/or the orientation of the at least three emitter devices relative to each other, based on the determined position of the emitter devices as detected by each of the detector devices.

A camera tracking system structured according to this teaching is advantageous in that the emitter device is moved immediately along with the studio/recording camera when the latter is moved and in that the spatial position of the emitter device is wirelessly detected by detecting cameras distributed over the studio. The recorded data are then evaluated directly by a computer so that the computer is aware of the actual position and orientation of the recording camera in the studio, and the same can be used for the television or video sequences.

Mounting the emitter devices directly on the recording camera or at the housing thereof or at a stand supporting the recording camera, is further advantageous in that the present camera tracking system can be used to determine the position of the camera on the ground (e.g. in the studio) and also to determine the momentaneous level of the camera above the ground, the actual pitch angle, the actual rolling angle and the actual pivot angle. Thus, it is possible, for example, for the camera man to carry his studio camera on his shoulder for a greater freedom of movement when recording the objects. In this case, the present camera tracking system is adapted to precisely, quickly and reliably determine the position in the studio and the position (height, rolling angle, pitch angle and pivot angle) of the camera.

The zoom and the focus of the studio camera are suitably determined using incremental path sensors integrated in the optics and detecting the setting of the respective optical elements. These path sensors, or detectors in general, are also connected to the computer unit to generate the studio background together with the detected position and orientation of the studio camera.

With the present camera tracking system it is possible to determine a position using three emitter devices and two detector devices, however, it is advantageous to employ five emitter devices and two detector devices. Using more than three emitter devices not only allows the determination of the position of the camera, but also the height, the rolling angle, the pitch angle, or the pivot angle, since the correlation of the individual emitter devices makes it possible to draw corresponding conclusions. The use of more than two detector devices allows the preset camera tracking system to more reliably determine the position of the individual emitter devices in the room since redundant data will be at hand.

Specifically, the connected computer determines a straight line through each emitter device starting from each detector device. The intersection of these straight lines lies exactly in the emitter device. Since the straight lines will not meet exactly in one point, due to measuring or calculation errors, a theoretical intersection is calculated by means of mathematic methods for error minimization. The correspondence between this theoretical intersection and the actual site of the emitter device is the more precise, the more straight lines are available.

Another advantage of this redundant system is that the computer has access to sufficient information for determining the position and the orientation of the studio camera if the emitter device for the one or the other detector device cannot be detected or if the emitter devices unfavorably cover each other. Experiments have shown that a camera tracking system with five emitter devices and four detector devices already ensures a very reliable and very precise determination of the position and the orientation of the studio camera. In an advantageous embodiment of the present camera tracking system ten or even twelve detector devices are used so that this camera tracking system allows for an even more precise and reliable determination of the position and the orientation of the studio camera.

The emitter devices to be employed with the invention are, in particular, light sources suitably emitting infrared light. The detector devices are preferably designed as detecting cameras. All other variants of the invention mentioned above can also be applied to the situation that the emitter devices are light sources and the detector devices are detecting cameras. This is also true for the following contemplations, wherein, for simplicity, "light sources" is used for emitter devices and "detecting cameras" is used for detecting devices.

Disposing the detecting cameras at least one meter above the light sources is advantageous in that a favorable angle of view is thus provided. In this case, the movement of the light sources (i.e., the studio camera) generates a displacement of the light source that is well visible in the images respectively supplied by the detecting cameras so that the evaluation by the computer is facilitated and made more precise thereby.

Distributing the detecting cameras in the studio as uniformly as possible has the advantage that the light sources are detected from a plurality of largely different angles of view so that a reliable geometric evaluation is achieved thereby.

In a preferred embodiment of the present camera tracking system, the light sources are all arranged in one plane at a supporting element that, in particular, takes the form of a ring. This is advantageous in that the light sources are arranged in a compact manner, yet they are spaced apart as far as possible so that a good detection by the detecting cameras is possible.

In a preferred development, a distance element is arranged between the light source and the ring so that the reflections from the light sources onto the ring are minimized and the light source is detected by the detecting camera as a point, as desired.

It is further suitable to make the vicinity of the light sources nonreflective, preferably black, so as to be able to detect the light sources with a rich contrast.

The arrangement of the light sources on a ring divided into equidistant sections, where one section or fixed point more than the total number of light sources is provided, has the advantage that a distinct asymmetric gap is left on the ring that is used for a unique identification of the light sources. Thus, it is achieved that the light sources are possibly all the same distance apart so as to be well identified on the images detected by the detecting cameras, and that at the same time an unambiguous direction can be associated with the ring of light sources. This clear direction may also be obtained, however, by arranging the light sources in a predetermined irregular pattern.

The use of infrared light in the present camera tracking system is advantageous in that the detecting cameras will not inadvertently detect other light sources in the studio and that scattered light occurring in the studio can be neglected.

In another, preferred embodiment the operating voltage at the light source is lower than the desired voltage of the light source. Specifically, when using a 12 Volt halogen lamp, an operating voltage of 4.5 Volt is applied. This is advantageous in that the light source mostly emits light in the infrared range and thus does not influence the overall lighting of the studio. It is another advantage that such low operating voltage lamps have a longer serviceable life and are less prone for trouble.

In a further preferred embodiment, the detecting camera is a commercially available CCD-TV camera for black-and-white shooting. Such TV cameras are available at low prices and usually include a filter for filtering out infrared light, since infrared light is undesirable for normal applications. The present camera tracking system, however, mostly uses infrared light so that this infrared filter integrated in the CCD TV camera may be removed for the CCD TV camera to also detect infrared light well.

In another, preferred embodiment, the detecting camera is provided with a filter filtering out visible light and transmitting only infrared light so that other light sources in the studio or undesired reflections in the range of visible light will not be detected by the detecting camera and cause an erroneous detection of the infrared light sources provided at the camera.

In another, preferred embodiment, the detecting camera has an automatic shutter control. Thus, the detecting camera may automatically control the amount of incident light required for the detection of the light sources.

In still another preferred embodiment of the present camera tracking system, the detecting camera operates at an image frequency of 50 Hertz (in Europe) and 60 Hertz (overseas), respectively, so that the detecting camera can be synchronized with the studio camera in an optimum manner. This is particularly advantageous because, in this manner, the data for determining the position and/or the orientation of the camera are present quasi simultaneously with the image recorded by the studio camera so that an optimum adjustment of the studio image to the computer image/virtual image may be obtained.

In a further development, the light sources are not operated at AC but DC. Thus, the light sources emit light permanently so that synchronizing the light source and the detecting camera is obsolete. This results in substantial cost reduction.

In still another preferred development, the light source is enclosed by a non transparent but at least partly translucent sphere of a diameter between 1 cm and 10 cm, preferably 5 cm. Thus, the light emitted by the light source is projected uniformly onto the surface of the sphere so that the illuminated surface of the sphere can be detected by the CCD chip of the detecting camera in a simple manner. This uniform and at the same time comparatively large light spot is clearly different from the background that is dark, at least in the infrared range, and thus prevents a blurring of the pictures recorded by the detecting camera and allows for a precise positional determination of the respective light source. Advantageously, this sphere is milled from Teflon, which has proven very favorable.

The images thus recorded by the detecting camera are then processed by a data processing unit (computer). Suitably, this is effected such that the images are first binarized before using a calculation of the geometric center, known per se, to separately calculate a geometric center of each light source for each image. Thus, a very precise position of the respective light source can be defined for each image from each detecting camera. Since the computer knows the position and the orientation (coordinates) of each fixedly installed detecting camera, the computer can determine a straight spatial line for each detecting camera leading through the image point on the CCD chip of the respective light source and a fixedly defined point in the detecting camera up to the light source. By superimposing a plurality of these straight lines (corresponding to the number of detecting cameras), the position of the light source in the room can be determined since the Light source has to be located in the intersection of these straight lines. In the next step, the computer calculates the position and coordinates of the camera from the now known position of the different light sources.

As briefly mentioned above, it is advantageous to design the emitter devices as light sources in the form of lighting elements having a spheric light area. In the most simple case, the light sources may be lamps. These lamps project upward from the supporting element, whereby they are reliably detectable by the detecting camera. However, experiments have shown that the optical distance of the centers of two adjacent light sources is very short given an unfavorable angle of the studio camera with respect to one or more detecting cameras so that a partial or complete optical overlapping of two light sources can occur. In this case, a detecting camera would see two different light sources as a single light source which could lead to faulty results. An optical overlapping of two light sources can best be avoided by light sources, or generally speaking, by emitter devices having planar emission surfaces. When light sources for emitting visible light or infrared light are used, the emission areas are backlit planar surface areas formed in the manner of discs, plates or the like. These planar surfaces are suitably located in the surface of the supporting member accommodating the lamps of the light sources.

A camera tracking system structured according to this development is advantageous in that the planar emission surfaces, which, in particular, are illuminated lighted surfaces, appear smaller or larger depending on the incident angle of the detecting camera, the lighted surfaces becoming smaller in extreme situations, mostly under an unfavorable angle to the detecting camera. The simultaneous reduction of the lighted surfaces and the optical distance, an optical overlapping will occur, if at all, only at extremely large pitches so that the detecting cameras will still supply useful data even if the angles between the studio camera and the detecting camera are extreme.

In an advantageous development, the lighted surfaces are arranged under a predetermined angle relative to each other. For example, some lighted surfaces area arranged horizontally and others are vertical. Generally speaking, the lighted surfaces are provided on two sides of the supporting member extending at right angles with respect to each other. This has the advantage that an even better optical separation is obtained and that a higher number of lighted surfaces can be provided on the supporting member (ring, frame, etc.). Thus, the camera still has a sufficient number of lighted surfaces for an exact and quick determination of the position and orientation of the camera, even under extreme pivot angles, rolling angles or pitch angles of the (studio) camera.

In an advantageous embodiment, light emitters (lamps, LEDs, etc.) are provided in an indentation or a cut-out behind the lighted surfaces. This is advantageous in that the detecting camera no longer detects all of the light emitters, but only the light beams from the opening of the recess or cut-out, forming an illuminated light surface.

In a further preferred embodiment, the recess or cut-out is closed with a cover. The cover protects the proper light source from soiling and/or damage. Here, it is advantageous to make the cover, at least, however, a window provided in the cover, from a translucent glass, a transparent plastic material or a film coated glass so that the light from the light emitter can pass therethrough. Here, the cover is the lighted surface.

In a particularly preferred embodiment, the cover or the window only transmits light at a wavelength of more than 800 nm so that only infrared light can pass the cover. Thereby, the contrast of the light spot to the vicinity, especially to the scattered light in the studio or to studio spotlights, is increased for the detecting camera that also only records infrared light.

When a cover or window is used that allows only light of a certain wavelength, for example, light of a wavelength of 850 nm, or light of a very narrow wavelength range, for example, light at a wavelength between 850 nm and 870 nm, to pass, the above described effect is even increased.

The diffuse emission of the light from the cover or the window is advantageous in that the light radiated from the 50 light emitting diodes is received by the detecting cameras as a uniform light spot, i.e., the 50 light spots or points of the 50 light emitting diodes quasi merge into a large light spot or a "closed" lighted surface.

The contrast is increased even further by the cover or the window emitting the transmitted light diffusely.

In a preferred development, the cover is substantially planar, offering the advantage that the light source appears as a two-dimensional lighted surface (planar lighted surface).

In another preferred development, the cover or the window is circular in shape. This is advantageous in that the detecting camera detects the light source as a round or, depending on the incident angle of the detecting camera, as an elliptic light spot. Thus, distortions of the geometric shape occurring under certain incident angles are reduced to a minimum so that a simple and reliable determination of the geometric center is possible.

In an alternative embodiment, the light emitter accommodated in a recess in the frame may be provided with two covers, preferably arranged at right angles to each other, so that one and the same light emitter can radiate light beams both upward and sideward. With such an arrangement, the detecting camera identifies each of the two covers as a separate lighted area so that, despite the light emitters being reduced to half their number, the same number of lighted areas is available to the detecting camera.

Thereby, the power consumption and thus the size of the required accumulator can be reduced, resulting in a substantial reduction of weight. A further reduction of weight and of costs is obtained by the lower number of light sources.

In a further preferred embodiment, the light source is formed by preferably 50 infrared light emitting diodes arranged within the frame in the recess or cut-out. The light emitting diodes operating in the infrared range require much less current than conventional lamps and, what is more, supply a higher amount of light in the infrared range. The latter substantially increases the contrast to the surrounding light. Moreover, the power consumption, and thus the required accumulator, may be reduced so that the overall weight of the camera tracking system can be reduced.

In another preferred embodiment, a plurality, preferably all, light sources can be switched individually. Thus, it is possible in a simple manner to initialize the camera tracking system. By subsequently turning on one light emitter at a time, the detecting cameras can define the respective light spot so that, later, the respective detected light spot can be associated with the correct position on the frame. It would be sufficient for initializing the camera tracking system to initialize at least one light spot in this manner, but the accuracy of the system increases if a plurality, or preferably all, light spots are initialized individually.

In another preferred embodiment, a gyroscope is mounted to the camera for determining the pivot angle, the pitch angle and the rolling angle of the camera. This gyroscope is used in addition to the detecting cameras so that a redundant determination of the orientation of the camera is effected. These redundant measured values are then used by software to calculate the orientation of the camera.

In a preferred development, the measured values obtained from the gyroscope are optimized, specifically, smoothed by a linear optimum filter (Kaiman-Bucy filter). This allows for a more precise determination of the actual orientation of the camera.

In another alternative embodiment, the lighted area is formed as a reflector. Specifically, analogous to the above described covers, the frame is provided with preferably two-dimensional and planar reflectors (or mirrors) that may possibly be arranged under an angle with respect to each other. The visible or infrared light in the studio is reflected from these reflectors so that it can be detected by the detecting cameras. Thus, such reflectors have the same function and effect for the detecting camera as a lighted surface or a light source.

It is the advantage of these reflectors (in particular the mirrors) that no diodes or other lamps and no power supply, i.e. no heavy accumulators, are required, resulting in a substantial reduction in weight and cost.

In another preferred embodiment, the light emitters are pulsed, i.e. the light emitters are turned on at regular intervals for only a very short time. Here, it has proven advantageous to analogously also operate the detecting cameras in a pulsed and synchronous manner In order to avoid erroneous measuring. Using the connected computer, the light emitters and the detecting cameras may be synchronized in a simple manner.

By turning the light emitters, in particular the light emitting diodes, on for only a short time, these may shortly be operated at a higher voltage so that the light emitting diodes emit about three times the amount of light as they would at their rated voltage. The improved intensity of the light source or the lighted area results in a better contrast so that the detecting camera can much better detect the lighted areas and, specifically, their edges It has proven advantageous to operate the light sources at a frequency of 50 Hertz and a lighting duration of $\frac{1}{5000}$ second. Alternatively, other frequencies form 10 to 200 Hertz and lighting durations from $\frac{1}{50}$ second to $\frac{1}{100000}$ second. Especially in countries, where the general current frequency is 60 Hertz, clocking the light sources at a frequency of 60 Hertz would be advantageous.

In a preferred embodiment, the shutter speed of the detecting camera is faster than the time interval between two pulses. This has the advantage that less foreign light reaches the photosensor of the detecting camera during this short shutter period, resulting in an improved contrast of the light areas over the environment.

In a preferred development, the shutter speed of the detecting camera is substantially the same as the lighting duration of the light emitting diodes. Thereby, the shutter of the detecting camera is open just long enough to receive the light from the light emitting diodes, but not long enough to receive more than the possible minimum of foreign light. This results in an even better contrast between the lighted areas and the environment.

It is a further advantage that, grace to the present camera tracking system, the (studio) camera can be employed independent from any rails. For example, the camera can be carried on the shoulder or be used for outside shooting (outdoors).

The present camera tracking system must be calibrated prior to being used in a virtual studio. To this end, the background detected by the detecting cameras may be provided with a grid behind the studio camera. Suitably, this is done by laying a "carpet" in the studio that has the grid thereon. The orientation and the position of the "carpet" within the studio should be known.

It Is advantageous to calibrate the present camera tracking system using electromagnetic radiation from a calibration device which again, preferably, is a light source. This calibration device is moved through the studio and detected by detector devices. Thus, a geometric relation of the detector devices among each other is calculated. In a second step, the calibration device is stationary and is detected by all detector devices. This provides for an alignment of the studio coordinate system to the geometric relation of the detector devices. In a last step, the calibration device is detected by the studio camera in order to fix the so-called nodal point of the studio camera relative to the emitter devices coupled with the studio camera. Due to the previously determined geometric relation of the detector devices to the calibration device, on the one hand, and the geometric relation of the studio camera to the calibration device, it is now possible to determine the geometric relation of the emitter devices coupled with the studio camera and the nodal point of the camera. Thus, the entire system is calibrated.

Further advantageous embodiments of the invention are mentioned in the dependent claims. For what is not mentioned In the above or the following regarding these embodiments, reference should be made to the corresponding dependent claims.

Further advantages of the present camera tracking system are obvious from the attached drawings and the following description of embodiments, serving to explain the Invention using (infrared) light sources and CCD detecting cameras. According to the invention, the above and further detailed features may be used either individually or in any combination. The embodiments mentioned are not intended as a final enumeration, but rather are of exemplary nature.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
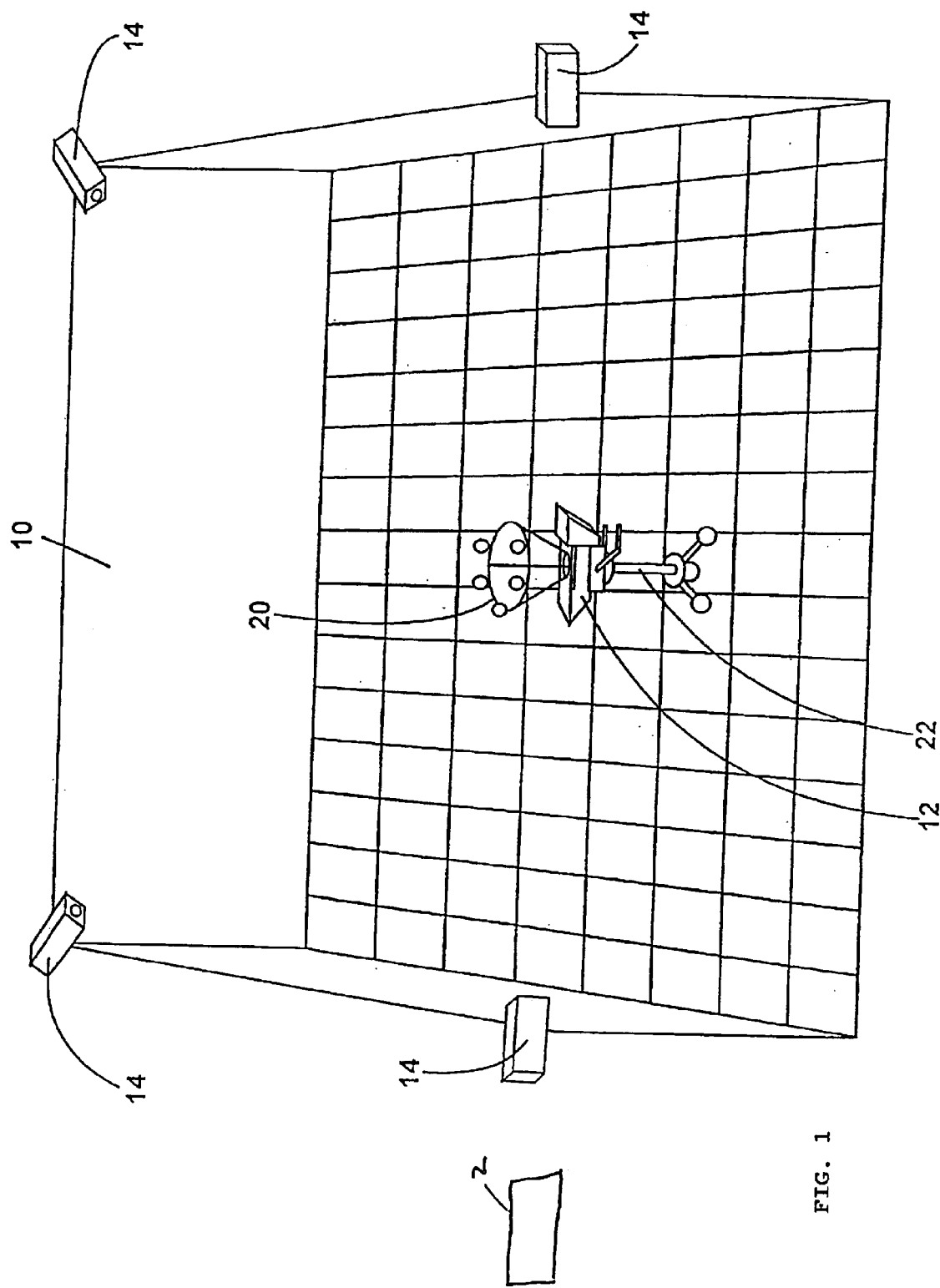
FIG. 1 illustrates a virtual studio including a first embodiment of a camera tracking system according to the present invention.

FIG. 1 illustrates a blue-room studio 10 with a (studio) camera 12 and four detecting cameras 14 suspended fmm the ceiling. The detecting cameras 14 are suspended as high as possible and as far as possible from the center of the blue-room studio and are distributed over the blue-room studio such that they detect the studio fmm different angles of view.

The detecting camera 14 used here is a commercial CCD TV camera for black-and-white shooting that was rearranged so as to be able to receive infrared light. Specifically, the infrared filter usually present in commercial CCD TV cameras can be removed and replaced with a filter filtering visible light and only transmitting infrared light. This restructuring yields a low-cost detecting camera that is adapted to detect light emitted in the infrared range particularly well. The light spots detected by the CCD chip are then supplied to a computer 2 for evaluation.

At a distance of about 50 cm, a ring 16 is mounted to the (studio) camera 12, which supports five light sources 20 through spacer elements 18. The light sources 20 are fixedly connected to the camera 12, therefore they follow all movements of the camera 12. The camera 12 is mounted on a vertically adjustable stand (tripod) 22, the legs of which have rollers so that the entire camera 12 can be moved through the blue-room studio 10 at will.

The ring 16 is divided into six sections of the same size so that six equidistant fixed points are produced on the ring 16. Each of the five light sources 20 is located on one of the six fixed points so that one fixed point 24 obviously remains free. This enables the detecting cameras 14 to unambiguously determine the orientation of the camera 12, since the arrangement of the light sources 20 is asymmetrical due to the free fixed point 24.

The light source 20 can be, for example, a commercially available 12 Volt halogen lamp enclosed by a spherical housing made of, for example, Teflon. The halogen lamps are operated at a DC voltage of 4.5 Volt so that they glow only weakly. The weak light emission thus obtained is mostly in the infrared range and may very well be detected by the detecting cameras 14 also operating in the infrared range. The housings made of Teflon are thin-walled such that one cannot see through, yet they are translucent. This results in a comparatively large light source 20 with an almost uniformly illuminated surface so that the detecting camera 14 can detect a clear light spot sharply contrasted with respect to the vicinity.

In Germany, the (studio) cameras 12 usually operate at an image frequency of 50 Hertz, while in America, an image frequency of 60 Hertz is used. For a correct association of the momentaneous position to the virtually generated background of the image by the computer evaluating the images supplied by the detecting camera 14, the detecting camera 14 should be synchronized with the (studio) camera 12 so that the exact momentaneous position can be determined for each image recorded by the camera 12. Accordingly, the detecting camera 14 can also operate at 50 or 60 Hertz, respectively.

The present camera tracking system's preferably operating in the infrared range has the advantage that scattered light and other light sources necessary for illuminating the actors or the stage are not or very badly detected by the detecting camera 14. The infrared light emitted by the light sources 20, however, is very well detected by the detecting camera 14, whereas the light in the visible range Is filtered. By such a separation of the different light spectrums, the camera tracking system can reliably determine the position and orientation of the camera 12.

The images recorded by the detecting cameras 14 are evaluated as described below:

Advantageously, the detecting cameras 14 are fixedly mounted to the studio ceiling, the position and the orientation of each detecting camera being precisely defined by calibration. During operation of the present camera tracking system, four shots of the light sources 20 are taken by the detecting cameras 14 exactly simultaneously, i.e. at the same frequency as and synchronized with the (studio) camera, the images being supplied to a the computer 2. The comparatively large light sources 20 form a correspondingly large light spot on the CCD chip of the detecting camera 14. The individual solid-state matrices of the CCD chips subsequently supply a corresponding signal to the computer 2, if the solid-state matrix receives infrared light beyond a certain threshold value.

The computer 2 evaluates the received light signals such that it recognizes only those signals as a true light source which are supplied by a corresponding number of adjacent solid-state matrices (binarize). Subsequently, a commonly used calculation of the geometric center is employed to determine the geometric center of each light source in the image. To this end, a rather large design of the individual light sources 20 is advantageous, since this allows the recording of relatively sharply outlined and at the same time rather large light spots. Moreover, the risk of confusing these with other light sources is minimized, since infrared light sources of this size are rare in a blue-room studio 10.

After having defined the individual light sources on each image of each detecting camera 14 by their geometric centers, a straight line is established extending through the geometric center of the light source on the CCD chip and a defined point within the detecting camera 14. Thus, the computer disposes of four straight spatial lines for each light source 20, which intersect at a certain point. This intersection is the actual location of the light source 20 in the blue-room studio 10. Since the different detecting cameras 14 detect the blue-room studio 10 from all sides, i.e. three-dimensionally, the position of each light source 20 in the room can be determined.

After having defined all five light sources 20 in the room, the position and the orientation (coordinates) of the (studio) camera 12 can be determined, since it is in a known relationship to the light sources 20.

In such measuring and evaluation of the light spots inaccuracies of measurement and/or calculation can inherently occur so that, in practice, it may happen that the four straight lines established by the computer 2 do not really meet in one point. Therefore, the computer performs generally known analytic error estimations so as to define a spatial point from the established four straight lines that correspond as exactly as possible to the actual position of the light source.

Figure 3:
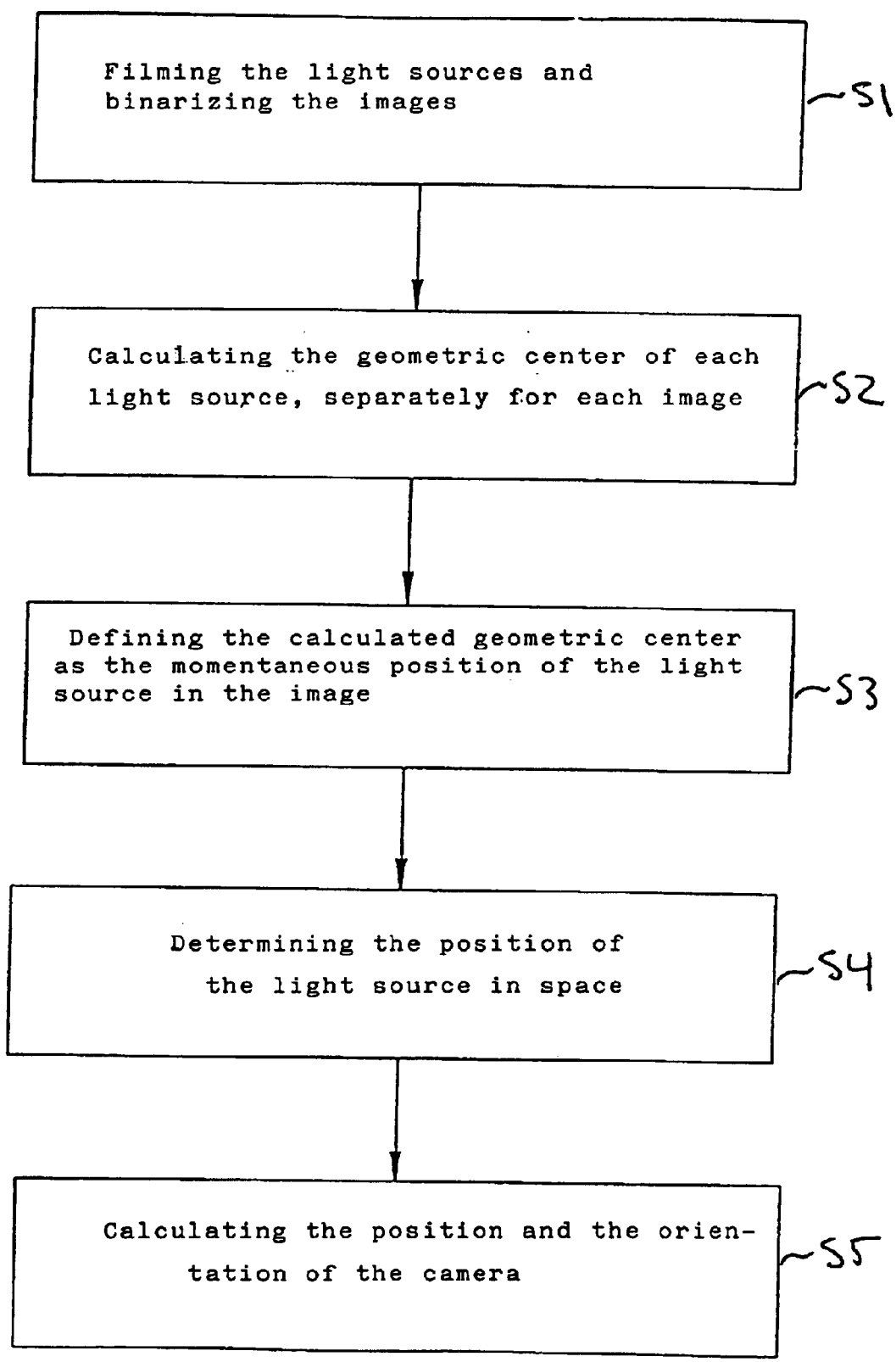
FIG. 3 is a flow chart for illustrating the method of tracking the studio camera.

Referring to FIG. 3, an orientation determination device 3, for example, a gyroscope, is mounted to the camera 12 for determining the pivot angle, the pitch angle, and the rolling angle of the camera. This gyroscope 3 is used in addition to the detecting cameras so that a redundant determination of the orientation of the camera is effected. These redundant measured values are then used by software provided by the computer 2 to calculate the orientation of the camera. The measured values obtained from the gyroscope 3 are optimized, specifically, smoothed by a linear optimum filter (Kaiman-Bucy filter). This allows for a more precise determination of the actual orientation of the camera 12.

In an a further embodiment (not illustrated), the present camera tracking system has ten or more detecting cameras. Among other things, this is advantageous in that ten straight lines can be defined in space that, theoretically, should meet in one point. These additional, redundant straight lines further increase the accuracy of the arithmetically determined light source as compared to the actual light source, since the additional data material can be used to better eliminate occurring measuring and/or calculating errors. It is another advantage that the redundant detecting cameras reliably detect the individual light spots, i.e. that an inadvertent covering of individual light spots has no great impact on the evaluation.

Figure 2:
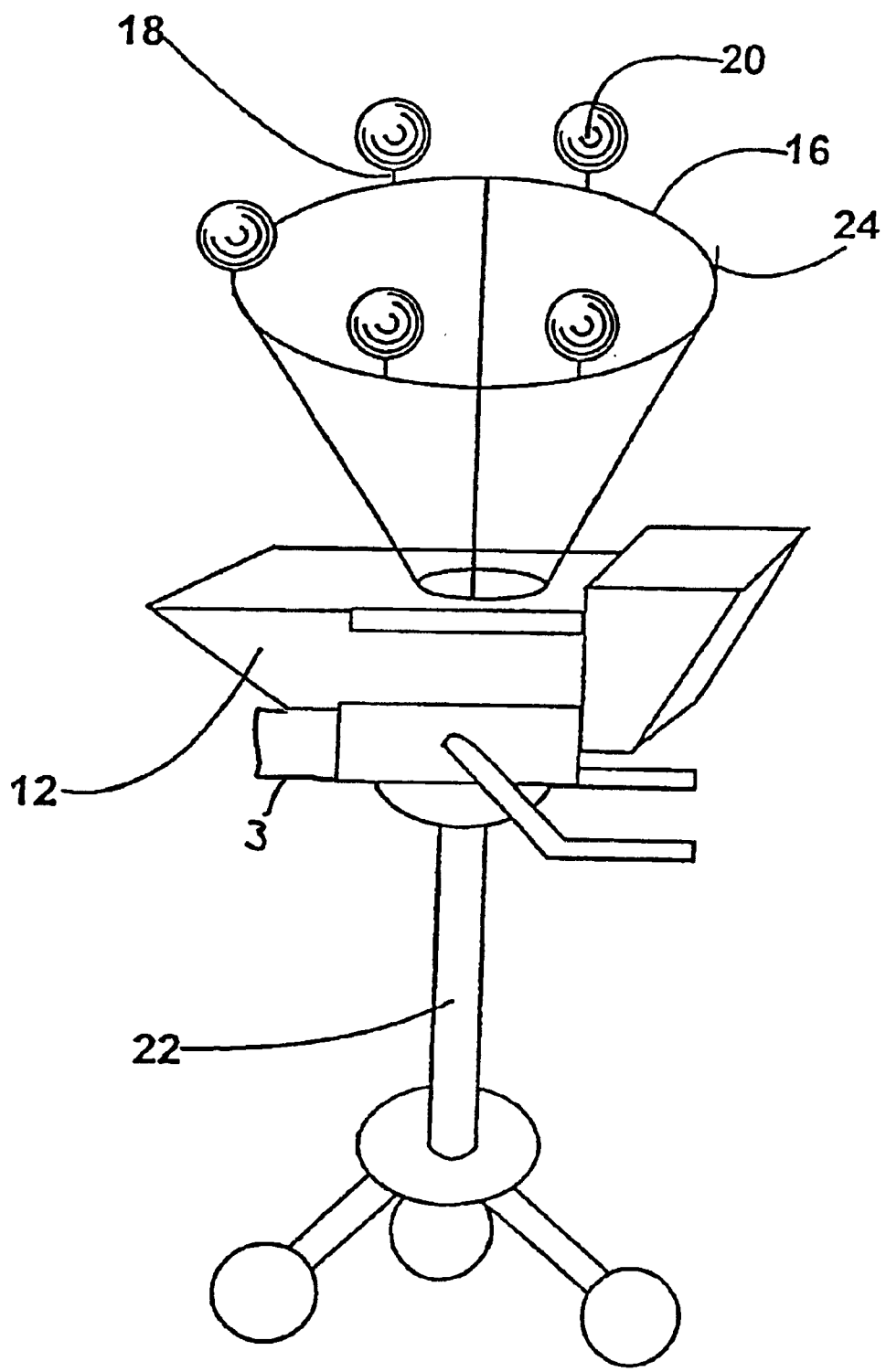
FIG. 2 shows a studio camera according to the first embodiment with annularly arranged light sources mounted thereto.
Figure 4:
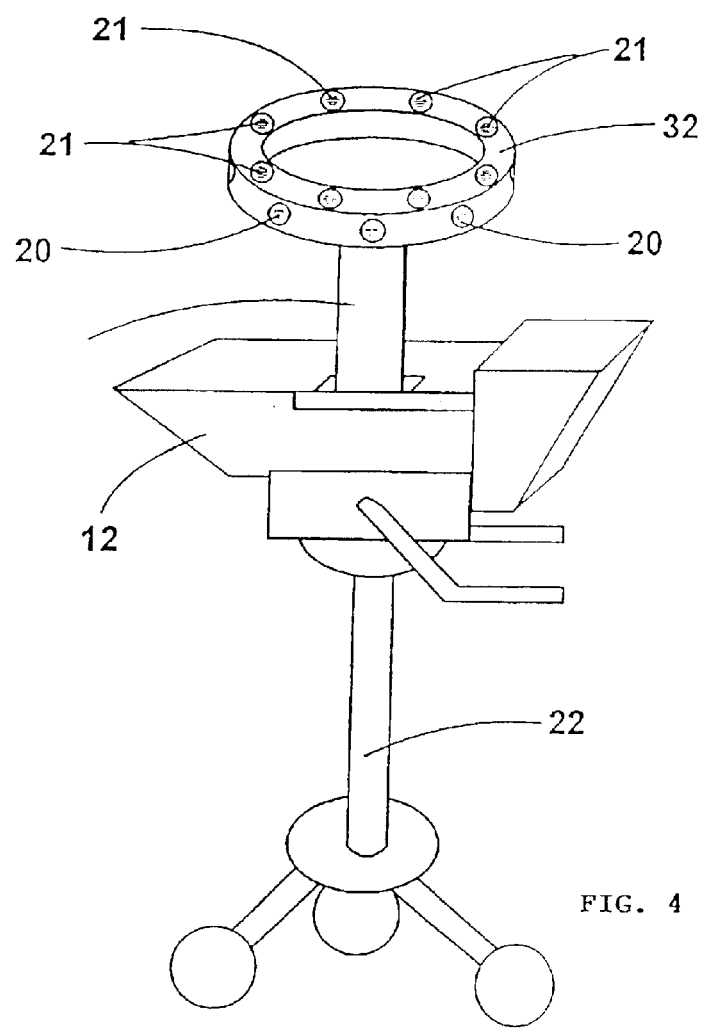
FIG. 4 is a perspective lateral view of a studio camera according to a second embodiment with an annular frame mounted thereto.
Figure 5:
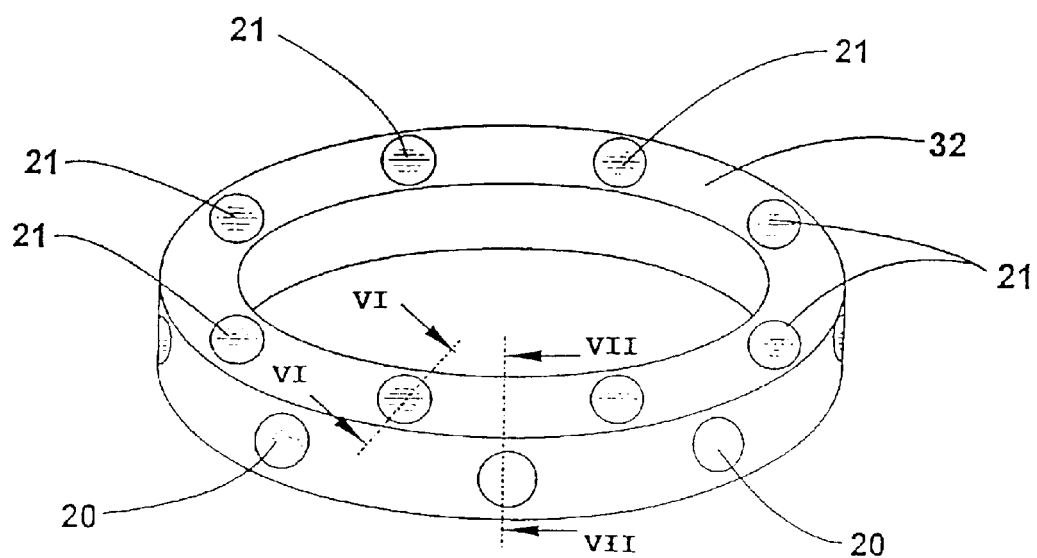
FIG. 5 illustrates the annular frame of the studio camera of FIG. 4.

FIGS. 4 to 7 illustrate the light sources of an alternative camera tracking system, mounted on a ring (frame). As far as the elements of this alternative system correspond to or are similar to those of the camera tracking system of FIGS. 1 to 3, they have been accorded the same reference numerals. FIG. 4 shows a (studio) camera 12 positioned on a tripod 22, which is provided with an annular frame 32 through a support member 30. This frame 32, rectangular in cross section and annular for the rest, has a number of circumferentially distributed, vertically arranged light areas or surfaces 20 and a number of horizontally arranged light areas or surfaces 21 independent from the light areas 20 and distributed over the front face of the frame 32. In the embodiment illustrated, the light areas 21 on the front face are each offset with respect to the circumferentially disposed light areas 20, the distance between the light areas 20, 21 approximately corresponding to the diameter of the light areas 20, 21.

In another embodiment (not illustrated), the light areas 21 on the front face and the light areas 20 on the circumference are in alignment with each other so that both may be supplied by the same light emitter.

Figure 6:
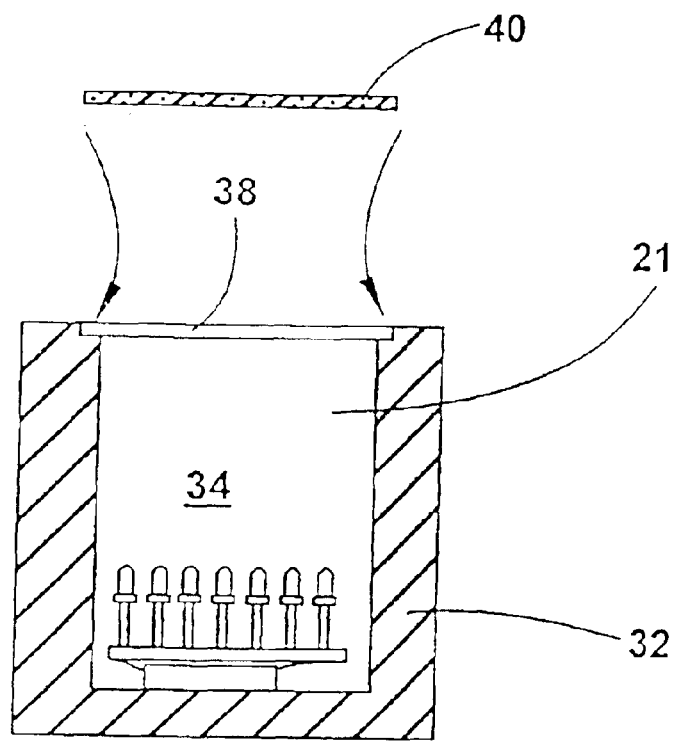
FIG. 6 is a sectional view of the frame of FIG. 5 along the line VI—VI.
Figure 7:
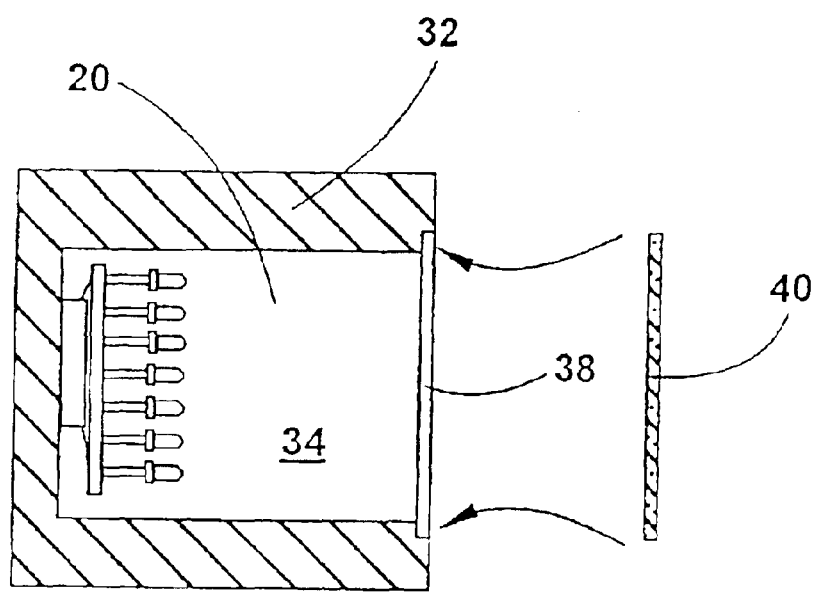
FIG. 7 is a sectional view of the frame of FIG. 5 along line VII—VII.

As is evident from FIGS. 6 and 7, in particular, the frame 32 has a number of recesses 34 accommodating the respective light emitter, the light emitter being formed by about 50 infrared light emitting diodes 36 arranged on the bottom of the recess 34. Here, the light emitting diodes 36 are orientated such that its major radiation direction is directed towards the opening 38 of the recess 34. This opening 38 is closed by a circular cover 40 of a film-covered glass material so that the light emitting diodes 36 are protected against damage and soiling. The light emitting diodes 36 radiate infrared light at a wavelength of 850 nm.

The cover 40 made from film-covered glass material only transmits light with a wavelength greater than 800 nm, the light being radiated diffusely so that light radiated from the light emitting diodes 36 as a point is detected by the detecting cameras as a uniform light spot. Thus, it is ensured that only infrared light, invisible to the human eye, can pass, which is then detected by the detecting cameras (not illustrated).

The light emitting diodes 36 are pulsed at a frequency of 50 Hz. the shutter of the shutter camera being operated synchronously therewith. Both are controlled through the connected computer 2. It has been found that the contrast is sharpest when the shutter speed equals the lighting period of the light emitting diodes, it being advantageous to open the shutter only after the light emitting diodes radiate light at full power. When 50 light emitting diodes are used, a lighting period, and thus a shutter speed of $\frac{1}{5000}$ second, has proven sufficient.

In an alternative embodiment (not illustrated), a recess has two openings, one directed upward through the front face of the frame, whereas the other is directed sideward through the circumferential side of the frame. Both openings are also closed with a cover that transmits only infrared light. In this embodiment, the light emitting diodes are arranged such that the infrared light emitted therefrom can leave the frame from both openings. Thus, one light emitter can generate two light areas that seem different to the detecting camera, resulting in considerable energy savings and a reduction in weight and costs.

In still another embodiment (not illustrated), the frame is provided with reflectors (or mirrors) instead of the infrared light transmitting covers. These reflect the visible or infrared light present in the studio so that the reflectors can be detected by the detecting cameras, mounted under the ceiling, as bright light spots. Thus, the detecting cameras can detect these reflectors as light areas (light sources) as well and determine the position and the orientation of the (studio) camera.

In order to determine the position and orientation or direction of a studio camera by the present camera tracking system according to one of the embodiments described, the following steps are taken after the system has been calibrated, with reference to FIG. 3. First, the light sources 20, attached directly to the studio camera 12 or indirectly via the stand 22, are detected by the detecting cameras 14. The images thus obtained are binarized for a subsequent separate calculation of the geometric center of each light source 20 in each image in step S1. Thereafter, the calculated geometric centers in step S2 are defined as the momentaneous position of the respective light source in the respective image in step S3. Taking into account the defined positions in the images from the detecting cameras 14 involved, the spatial position of each single light source 20 is then determined in step S4. Using this determination, the momentaneous position and/or the momentaneous orientation or direction of the studio camera 12 is calculated from the spatial position of the individual light sources 20 in step S5. When the momentaneous position and direction or orientation of the studio camera 12 has been calculated, the graphic computer, which generates the virtual background in the blue studio 10, may generate the background image corresponding to the camera position and orientation and the same may be projected onto the background.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A camera tracking system for a virtual television or video studio for determining the position and/or orientation of a recording camera, comprising:
   at least three emitter devices for emitting electromagnetic radiation, the emitter devices being adapted to be mechanically coupled with the recording camera;
   at least two detector devices for detecting the position of the emitter devices based upon the electromagnetic radiation emitted by the emitter devices, each detector device being adapted to detect plurality of emitter devices;
   a computer unit for calculating detected values based on an evaluation of the electromagnetic radiation detected by the detector devices and emitted by the emitter devices ;and a gyroscope adapted to be coupled to the emitter devices and supplying measured values pertaining to an orientation of the emitter devices, the gyroscope being connected to the computer unit, the computer unit processing the measured values from the gyroscope and the detected values for the determination of the position and/or the orientation of the emitter devices.

2. The camera tracking system of claim 1, wherein the emitter devices are active transmitter devices for emitting the electromagnetic radiation towards the detecting devices or passive reflector devices for reflecting electromagnetic radiation towards the detector devices.

3. The camera tracking system of claim 1, wherein the emitter devices are arranged on a support member adapted to be coupled with the recording camera.

4. The camera tracking system of claim 3, wherein the emitter devices are arranged on the support member such that they radiate the electromagnetic radiation from a common side surface or from two side surfaces disposed angularly relative to each other, in particular substantially at right angles.

5. The camera tracking system of claim 3, wherein the support member is a ring with an upper front face and a laterally extending circumferential face adjoining the front face.

6. The camera tracking system of claim 5, wherein the emitter devices are disposed on the front face of the ring.

7. The camera tracking system of claim 5, wherein the emitter devices are also disposed on the circumferential surface.

8. The camera tracking system of claim 1, wherein the emitter devices each have a spherical emitter surface from which the electromagnetic radiation is radiated and/or from which it is reflected.

9. The camera tracking system of claim 8, wherein the emitter devices each have a planar emitter surface from which the electromagnetic radiation is radiated and/or from which it is reflected.

10. The camera tracking system of claim 9, wherein the emitter surfaces lie in a common side surface or in the two angled side surfaces of the support member.

11. The camera tracking system of claim 1,
    wherein a calibration device is provided that emits electromagnetic radiation and is designed, in particular, as a light source preferably emitting in the infrared range, the calibration device being detectable by the detector devices and the studio camera, and
    wherein the computer unit determines the geometric relationship of the detecting devices relative to each other from the signals supplied by the detector devices upon movement of the calibration device and determines the geometric relationship of the detector devices relative to the studio from the signals supplied by the detector devices with the calibration device standing still, and determines the relative position of the nodal point of the studio camera to the arrangement of the emitter devices coupled to the studio camera, from the signals supplied by the studio camera upon detecting the calibration device.

12. The camera tracking system of claim 1, wherein the emitter devices comprise light sources particularly emitting light in the infrared range, and that the detecting devices are designed as detecting cameras for the light from these light sources.

13. The camera tracking system of claim 12, wherein the light sources of the emitter devices are located in recesses of the support member, and that the recesses are each covered by a cover that forms the emitter surface.

14. The camera tracking system of claim 13, wherein the covers diffusely radiate the light from the light sources.

15. The camera tracking system of claim 12, wherein the light sources are light emitting diodes, each emitter device being associated with a plurality of light emitting diodes that may be switched individually, in groups or commonly.

16. The camera tracking system of claim 8, wherein the emitter surfaces of the emitter devices are designed as reflectors for electromagnetic radiation.

17. The camera tracking system of claim 1, wherein the emitter devices are distributed irregularly.

18. The camera tracking system of claim 1, wherein the emitter devices are distributed regularly.

19. A camera tracking system comprising:
    an emitter unit that is fixedly attached to a camera, the emitter unit emitting electromagnetic radiation;
    a detector unit for detecting the electromagnetic radiation in order to provide detected values that are based on a position of the emitter unit;
    an orientation determination device, being fixedly attached to the camera, for supplying measured values; and
    a computer unit for receiving the detected values and the measured values, the computer unit calculating a position of the camera on the basis of the detected values and the measured values.

20. The camera tracking system according to claim 19, wherein the measured values, which are supplied by the orientation determination device, are based on a pivot angle, a pitch angle, or a rolling angle of the camera.

21. The camera tracking system according to claim 19, wherein the orientation determination device is a gyroscope.

22. A method of tracking a camera, comprising:
    detecting, by a detector unit, electromagnetic radiation that is emitted by an emitter unit, the emitter unit being fixedly attached to the camera;

providing detected values that are based on the electromagnetic radiation detected by the detector unit;

providing measured values that are provided by an orientation determination device, which is fixedly attached to the camera; and calculating a position and/or an orientation of the camera by a computer unit on the basis of the detected values and the measured values.

* * * * *